(12) United States Patent
Pettey

(10) Patent No.: US 8,324,773 B2
(45) Date of Patent: Dec. 4, 2012

(54) HOBBY SERVO SHAFT ATTACHMENT MECHANISMS HAVING TEXTURED SURFACES

(75) Inventor: Brian T. Pettey, Winfield, KS (US)

(73) Assignee: Robotzone LLC, Winfield, KS (US)

( * ) Notice: Subject to any disclaimer, the term of this patent is extended or adjusted under 35 U.S.C. 154(b) by 192 days.

(21) Appl. No.: 12/952,862

(22) Filed: Nov. 23, 2010

(65) Prior Publication Data
US 2011/0115344 A1  May 19, 2011

Related U.S. Application Data

(63) Continuation-in-part of application No. 12/187,690, filed on Aug. 7, 2008, now Pat. No. 7,859,151.

(60) Provisional application No. 60/964,120, filed on Aug. 9, 2007.

(51) Int. Cl.
*H02K 7/10* (2006.01)
(52) U.S. Cl. ..................... 310/75 R; 310/75 D
(58) Field of Classification Search ............. 310/75 R, 310/75 D, 80, 96, 98
See application file for complete search history.

(56) References Cited

U.S. PATENT DOCUMENTS

| | | | |
|---|---|---|---|
| 2,364,599 A | 12/1944 | Burrus | |
| 2,703,847 A | 3/1955 | Kalikow | |
| 3,735,164 A * | 5/1973 | Linn et al. | 310/41 |
| 4,081,705 A * | 3/1978 | Johnson | 310/90 |
| 4,429,204 A * | 1/1984 | McGuire et al. | 219/751 |
| 4,754,659 A * | 7/1988 | Rietsch | 74/411 |
| 5,492,024 A | 2/1996 | Siner | |
| 5,533,712 A | 7/1996 | Fujikawa et al. | |
| 5,762,439 A * | 6/1998 | Siner | 403/359.6 |
| D472,030 S * | 3/2003 | Lee | D34/33 |
| 7,270,589 B1 | 9/2007 | Brown, Jr. et al. | |
| 7,336,009 B2 * | 2/2008 | Pettey | 310/75 R |
| 7,675,207 B2 * | 3/2010 | Kasai | 310/75 R |
| 7,859,151 B2 | 12/2010 | Pettey | |
| 7,934,691 B2 * | 5/2011 | Pettey | 248/676 |

* cited by examiner

*Primary Examiner* — Thanh Lam
(74) *Attorney, Agent, or Firm* — Westman, Champlin & Kelly, P.A.

(57) ABSTRACT

An apparatus for enhancing an operational capacity of a hobby servo motor having a splined output shaft is disclosed. An apparatus illustratively includes a spline receiving portion. The spline receiving portion includes a plurality of circumferentially distributed protrusions sized and dispersed so as to support a functional engagement of the apparatus to the splined rotatable output shaft. The spline receiving portion optionally includes a top receiving surface. When the spline receiving portion is functionally engaged to the splined rotatable output shaft, the top receiving surface is positioned proximate to and flushly engages a top surface of the splined rotatable output shaft. An apparatus may further include an elongated shaft. The elongated shaft has an outer surface and at least a portion of the outer surface is textured.

20 Claims, 13 Drawing Sheets

HOBBY SERVO SHAFT ATTACHMENT MECHANISMS HAVING TEXTURED SURFACES

REFERENCE TO RELATED CASES

The present application is a continuation-in-part of and claims priority of U.S. patent application Ser. No. 12/187,690, filed Aug. 7, 2008 and of U.S. provisional patent application Ser. No. 60/964,120, filed Aug. 9, 2007, the contents of which are hereby incorporated by reference in their entireties.

BACKGROUND

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servos that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos.

Because hobby servos are relatively small and inexpensive, they are popular within the hobby-mechanical industry for applications such as, but by no means limited to, hobby robotic applications and radio-controlled models (cars, planes, boats, etc.). One example of a hobby servo is the Futaba S-148 available from Futaba Corporation of America located in Schaumburg, Ill.

SUMMARY

An apparatus for enhancing an operational capacity of a hobby servo motor having a splined output shaft is disclosed. An apparatus illustratively includes a spline receiving portion. The spline receiving portion includes a plurality of circumferentially distributed protrusions sized and dispersed so as to support a functional engagement of the apparatus to the splined rotatable output shaft. The spline receiving portion optionally includes a top receiving surface. When the spline receiving portion is functionally engaged to the splined rotatable output shaft, the top receiving surface is positioned proximate to and flushly engages a top surface of the splined rotatable output shaft. An apparatus may further include an elongated shaft. The elongated shaft has an outer surface and at least a portion of the outer surface is textured.

DETAILED DESCRIPTION

Figure 1:
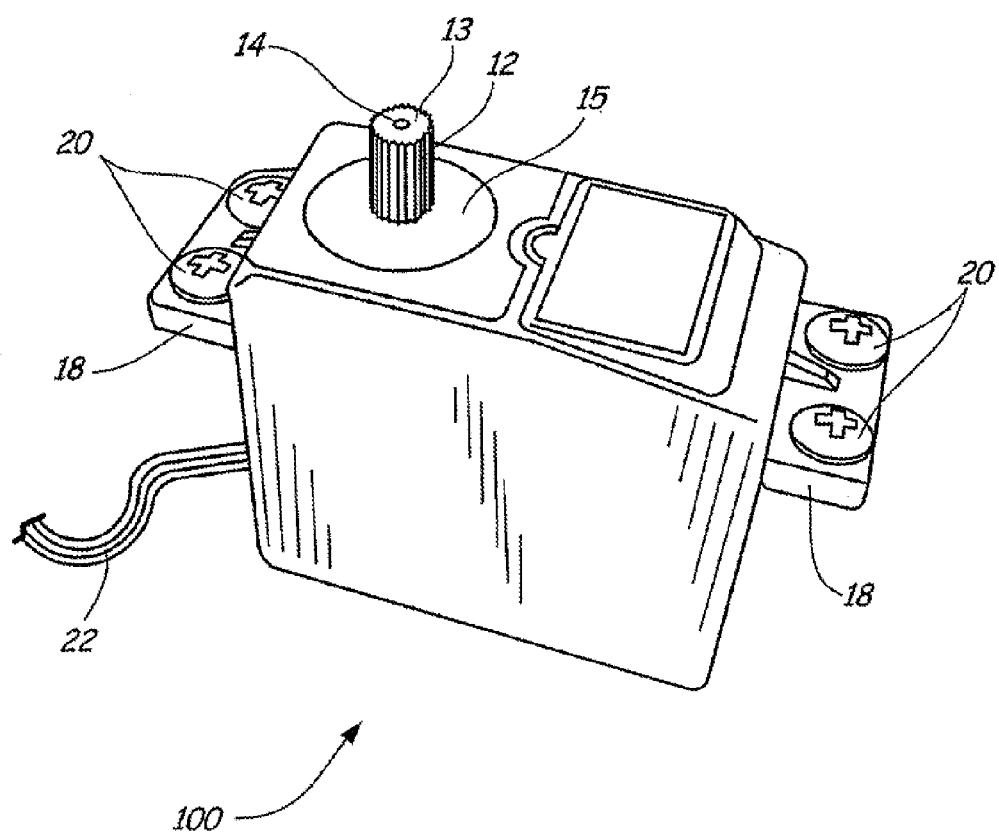
FIG. 1 is a perspective view of an exemplary hobby servo.

Certain embodiments described herein are intended for implementation in association with a motor such as, but not limited to, a hobby servo motor, or more simply stated, a hobby servo. FIG. 1 is a perspective view of one example of a suitable hobby servo 100. Hobby servo 100 can be any type of hobby servo and is not limited in terms of its style, capacity, motor speed, or load carrying capability. Hobby servo 100 is not intended to suggest any limitation as to the scope of use or functionality of the claimed subject matter. Neither should hobby servo 100 be interpreted as having any dependency or requirement relating to any one or combination of illustrated components.

Hobby servo 100 includes a rotatable splined output shaft 12, rotable splined shaft output top 13, threaded orifice 14, circular planar surface 15, a pair of flanges 18, mounting screws 20, and an electrical cable 22. Splined output shaft 12 has teeth (or ridges) distributed around the outside surface of the output shaft. This configuration is described as a "male" spline configuration. Standard configurations of hobby servos have 23, 24, or 25 teeth. Threaded orifice 14 extends into splined output shaft 12 and is adapted to receive an attachment screw (not shown). Flanges 18 are adapted to receive mounting screws 20. Flanges 18 and screws 20 are adapted to work in combination to mount hobby servo 100 in an operating environment. Electrical cable 22 is attached to the hobby servo 100 and provides electrical power and/or electrical signals to cause the output shaft 12 to rotate in a counter-clockwise or clockwise direction.

Figure 2:
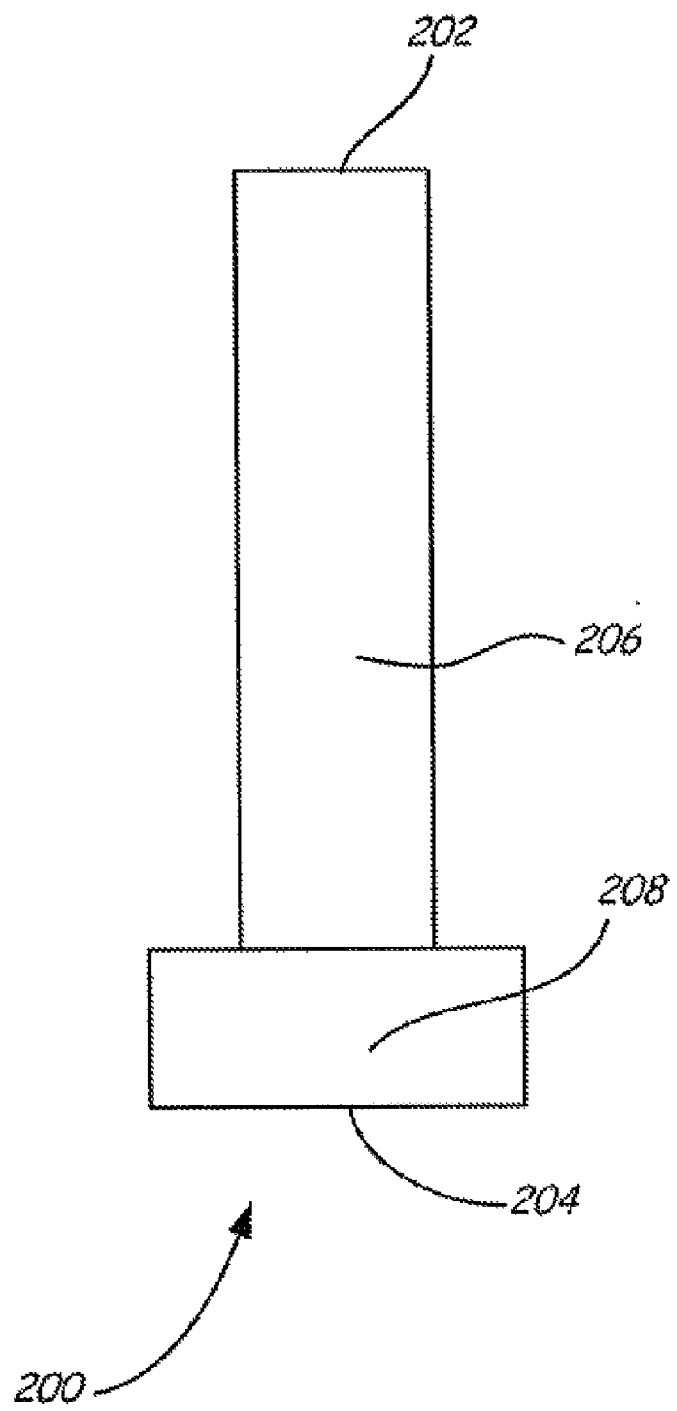
FIG. 2 is a side view of a hobby servo shaft attachment mechanism.

FIG. 2 is a side view of an embodiment of a hobby servo shaft attachment mechanism 200 (hereinafter "HSAM 200"). HSAM 200 includes a top surface 202, a bottom surface 204, an attachment surface 206, and an output shaft attachment housing 208. In an embodiment, attachment surface 206 provides a cylindrical surface that receives attachment items that include a bore. The diameter of the cylindrical surface of HSAM 200 is manufactured to any desired value. For example, the bore is made to accommodate ¼" or ⅜" bored attachment items. Attachment surface 206 need not be a cylindrical area. Embodiments of attachment surface 206 include every shape and size.

Figure 3:
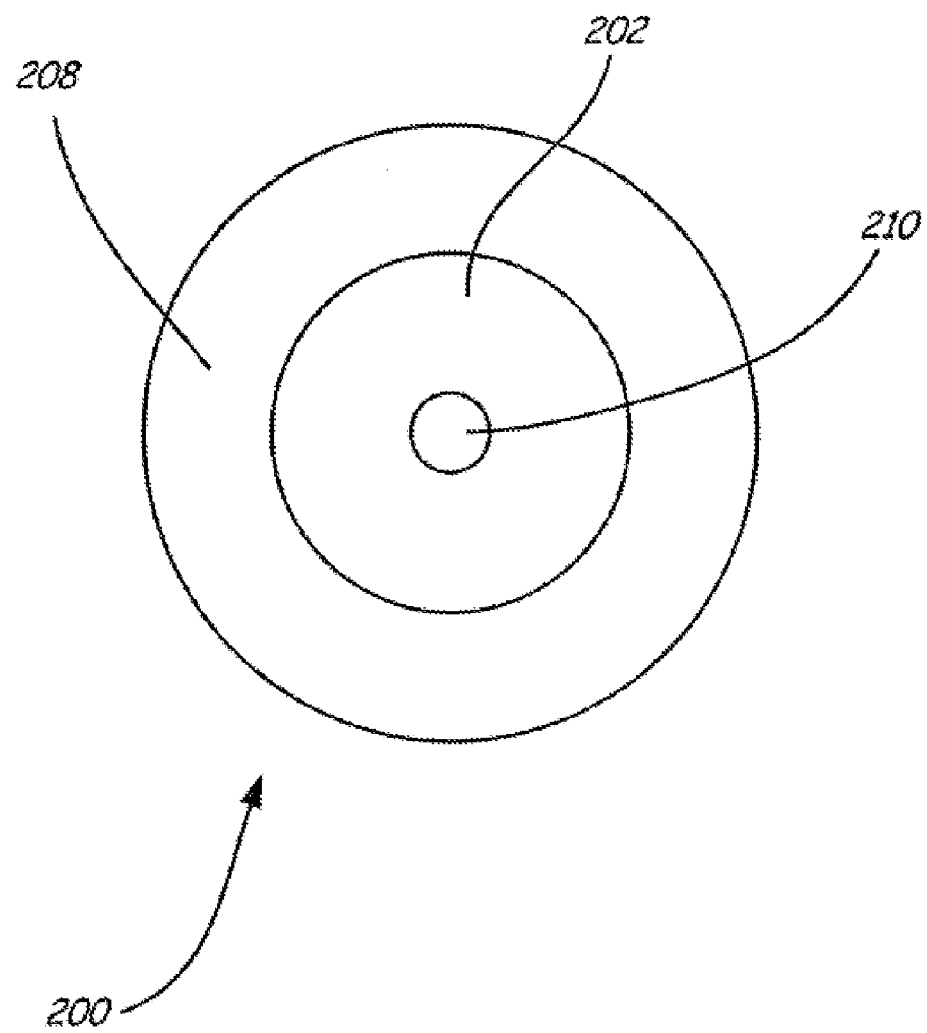
FIG. 3 is a top view of a hobby servo shaft attachment mechanism.

FIG. 3 is a top view of an embodiment of HSAM 200. HSAM 200 includes top surface 202, output shaft attachment housing 208, and attachment mechanism orifice 210 (hereinafter "AMO 210"). In an embodiment, AMO 210 provides an opening that extends from top surface 202 to bottom surface 204 (shown in FIG. 2). In an embodiment, AMO 210 receives an attachment mechanism such that HSAM 200 is secured to hobby servo 100. In one embodiment, AMO 210 receives a screw that has a head with a larger diameter than AMO 210 such that the head of the screw rests on top surface 202. In that embodiment, the screw extends through AMO 210 and threads into the standard engagement inside servo output shaft orifice 14. It is worth noting that in certain embodiments, HSAM 200 and output shaft 12 are in-line with each other, meaning that HSAM 200 and output shaft 12 share a common axis that they rotate around.

Figure 4:
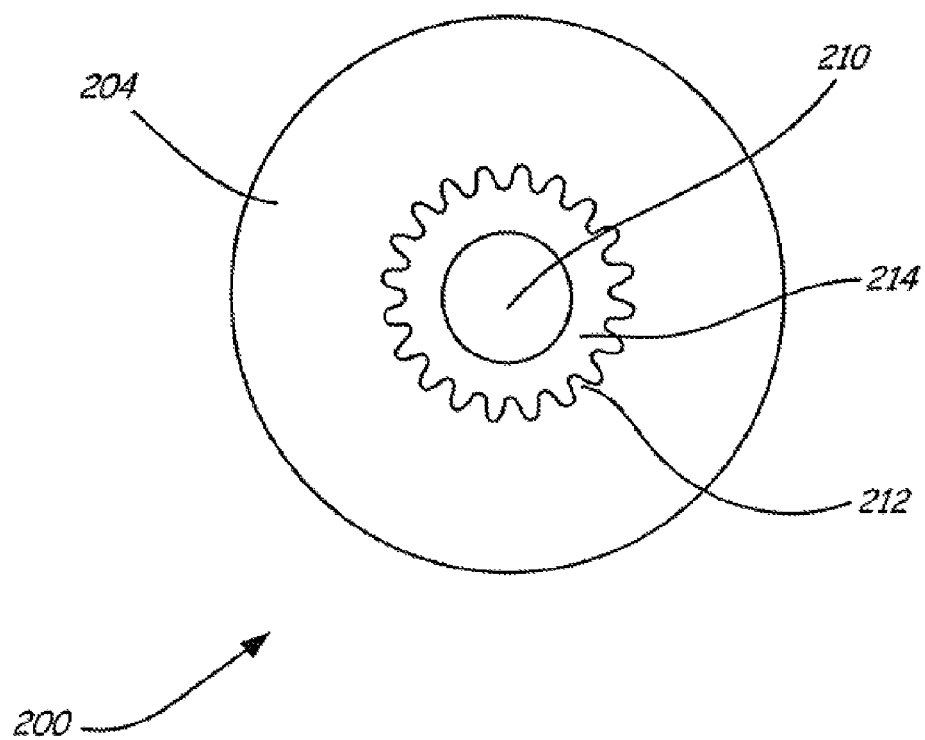
FIG. 4 is a bottom view of a hobby servo shaft attachment mechanism.

FIG. 4 is a bottom view of an embodiment of HSAM 200. HSAM 200 includes bottom surface 204, AMO 210, spline receiving surface 212, and top receiving surface 214. In an embodiment, spline receiving surface 212 includes a plurality of surfaces (e.g., teeth) that are configured to engage the teeth (or ridges) of the rotable splined output shaft 12. Other embodiments include top receiving surface 214 flushly engaging rotable splined shaft output top 13 and bottom surface 204 flushly engaging circular planar surface 15. Embodiments of spline receiving surface 212, bottom surface 204, and top receiving surface 214 include any number of surfaces and any surface shapes that engage or flushly engage any embodiments of rotable splined output shaft 12 and/or circular planar surface 15.

Figure 5:
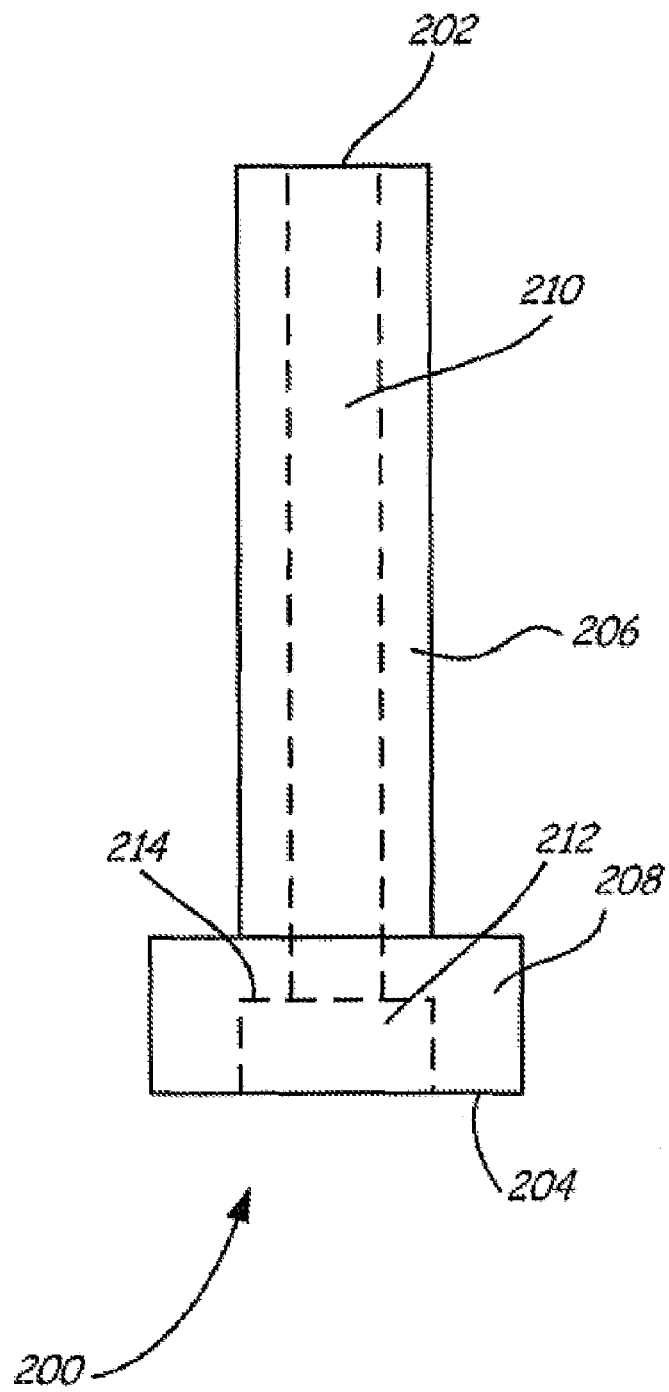
FIG. 5 is a side view of a hobby servo shaft attachment mechanism that highlights internal features.

FIG. 5 is a side view of an embodiment of HSAM 200 that highlights internal features with dotted lines. HSAM 200 includes top surface 202, attachment mechanism orifice 210, attachment surface 206, output shaft attachment housing 208, top receiving surface 214, spline receiving surface 212, and bottom surface 204. Embodiments of HSAM 200 include any desired dimensions. Embodiments of HSAM 200 are made from every material. Examples of materials include rigid materials such as 6061 T6 aluminum.

Figure 6:
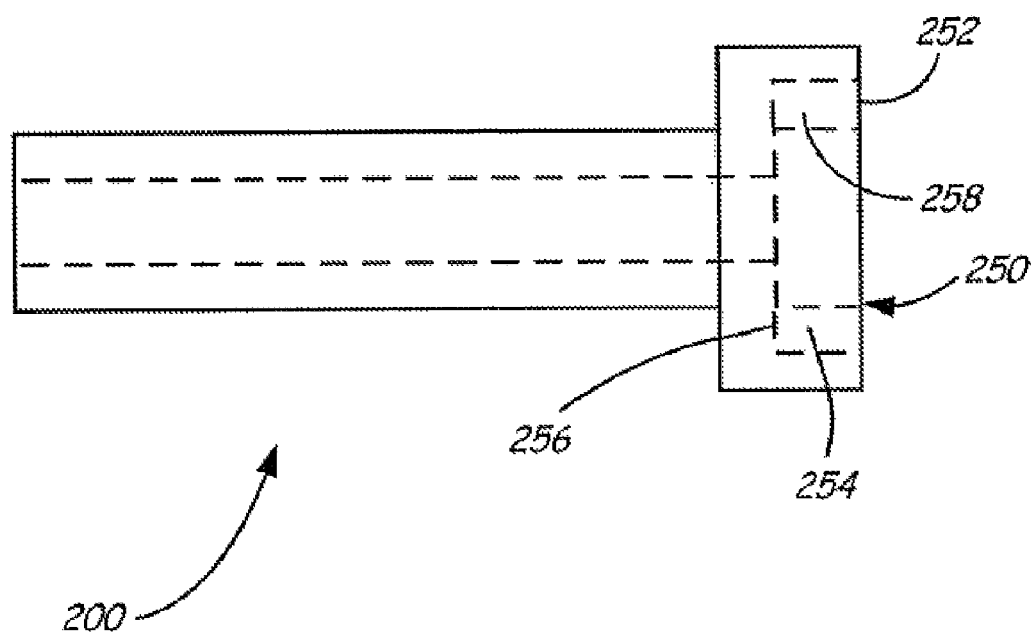
FIG. 6 is a side view of a hobby servo shaft attachment mechanism that highlights internal features.
Figure 7:
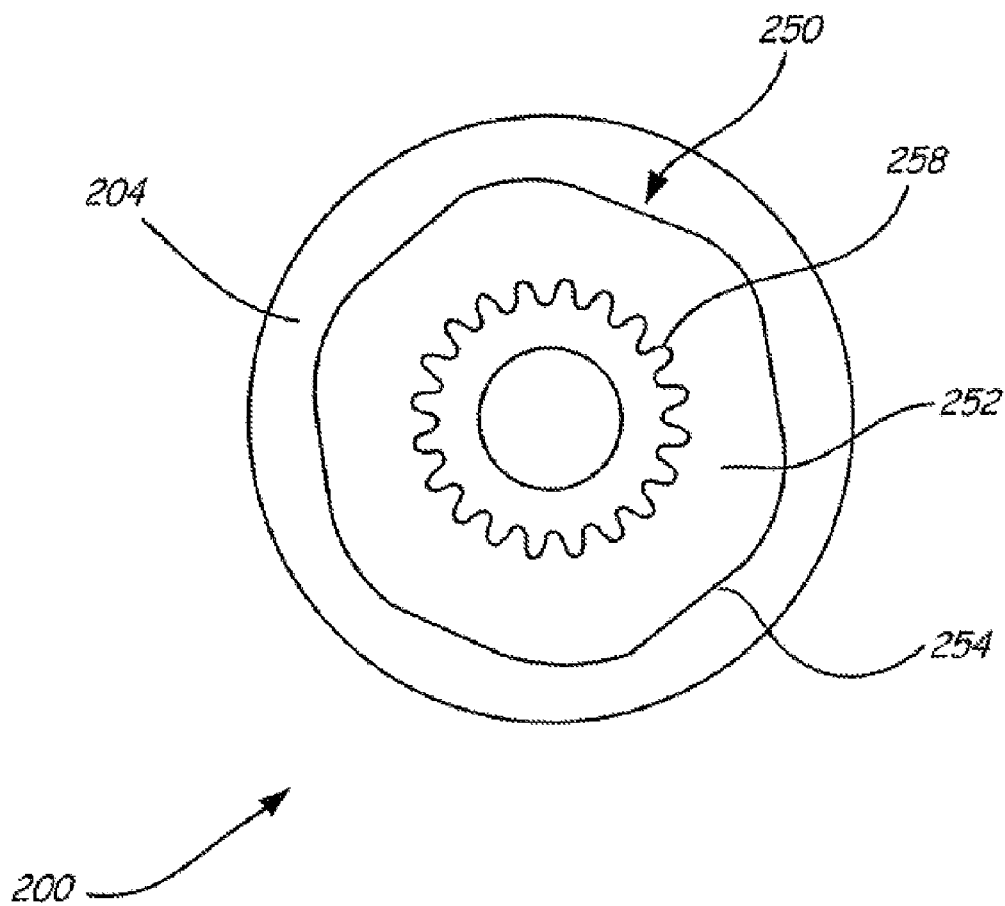
FIG. 7 is a bottom view of a hobby servo shaft attachment mechanism.

FIG. 6 is a side view of an embodiment of HSAM 200 that includes an inner output shaft housing 250 (hereinafter "IOSH 250"), and FIG. 7 is a bottom view of an embodiment of HSAM 200 that includes IOSH 250. IOSH 250 include a bottom surface 252, an outer circumferential surface 254, a top surface 256, and a spline receiving surface 258. In an embodiment, spline receiving surface 258 includes a plurality of surfaces that securely engage the teeth (or ridges) of the rotable splined output shaft 12. Embodiments of spline receiving surface 258 include any number of surfaces and any surface shapes.

Embodiments of outer circumferential surface 254 include any number of sides such as six. In some embodiments the sides come together at sharp angles. In other embodiments the sides come together at rounded corners. In yet other embodiments, outer surface 254 is cylindrical and includes no sides.

Embodiments of IOSH 250 have dimensions and are shaped such that they fit flushly within embodiments of output shaft attachment housing 208 including top receiving surface 214. Embodiments of IOSH 250 are made of every material. Some embodiments are made of plastic, rubber, and metal. In one embodiment, the IOSH 250 material is chosen based at least partially upon the type of material or shape of output shaft 12. In another embodiment, IOSH 250 is laser cut from plastic and press-fit into output shaft attachment housing 208. In yet another embodiment, IOSH 250 and housing 208 are engaged such that rotation from output shaft 12 is transferred from IOSH 250 to attachment surface 206.

Figure 8:
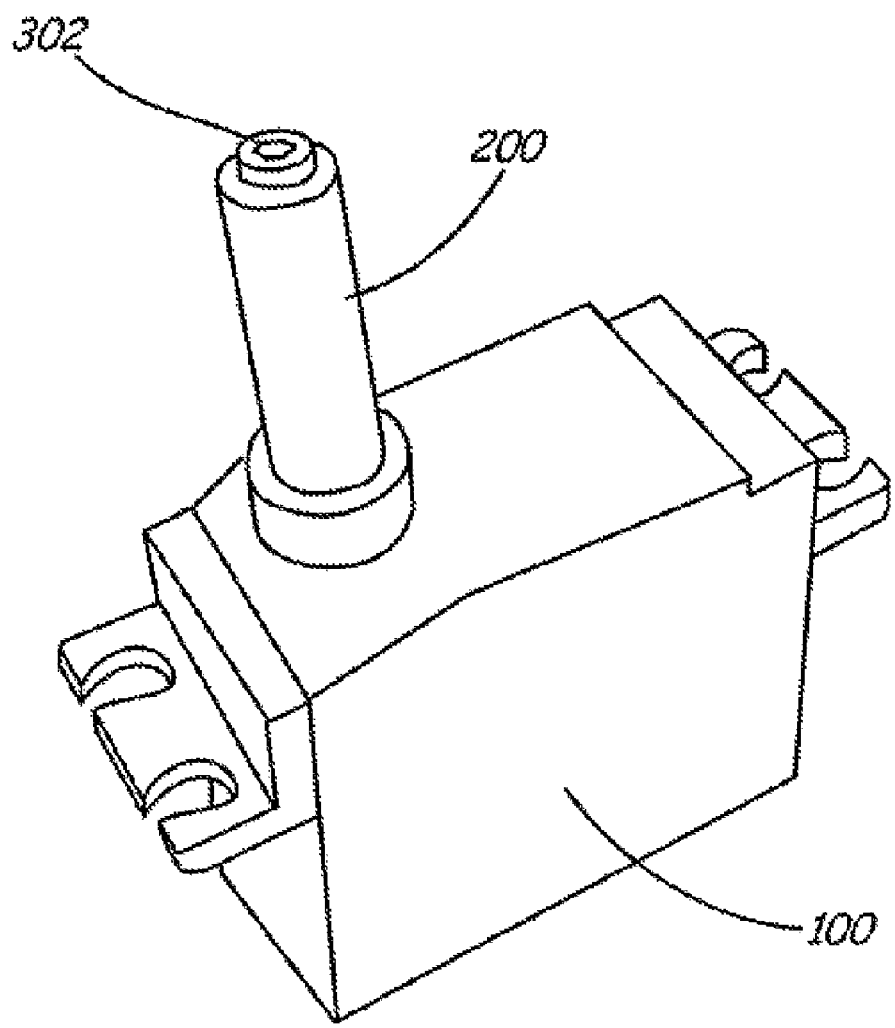
FIG. 8 is a perspective view of a hobby servo shaft attachment mechanism attached to a hobby servo.

FIG. 8 is a perspective view of an embodiment of HSAM 200 attached to an exemplary hobby servo 100. In an embodiment, HSAM 200 is securely and functionally engaged to output shaft 12 (shown in FIG. 1), and HSAM 200 bottom surfaces 204 and/or 252 are flushly engaged with circular planar surface 15 (also shown in FIG. 1). In an embodiment, HSAM 200 is securely attached to hobby servo 100 using screw 302. In other embodiments, attachment mechanisms other than screws are used. The attachment of HSAM 200 to hobby servo 100 provides many useful features. HSAM 200 provides enhanced performance such as increased strength and durability. HSAM 200 supports greater side-loads on the servo than the servo could support alone. HSAM 200 also allows for items that cannot be directly attached to a hobby servo to be indirectly attached.

Figure 9:
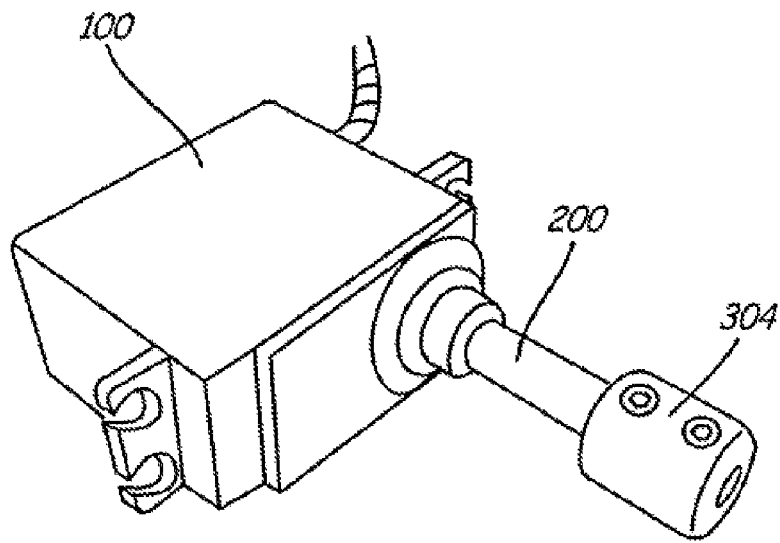
FIG. 9 is a perspective view of a coupler attached to a hobby servo shaft attachment mechanism.

FIG. 9 is a perspective view of an embodiment of a coupler 304 attached to HSAM 200. Coupler 304 connects to items such as, but not limited to, axles and gears, and rotates the items utilizing the output from hobby servo 100. Coupler 304 and HSAM 200 allow items to be connected that otherwise could not be connected to hobby servo 100. They also provide a more durable connection. For example, HSAM 200 reduces the chances that splined output shaft 12 (not shown) will be stripped during operation.

Figure 10:
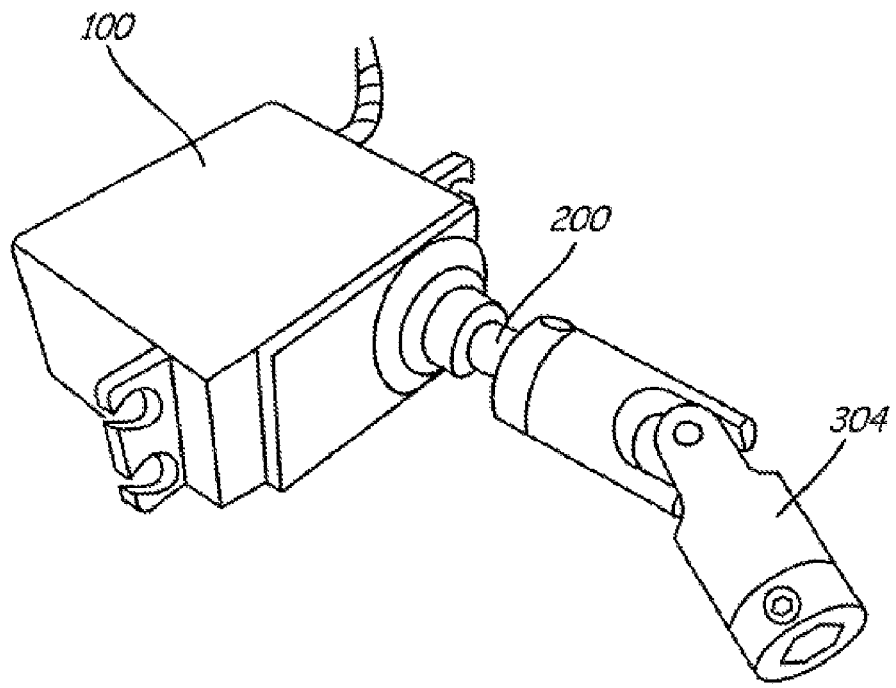
FIG. 10 is a perspective view of a universal joint attached to a hobby servo shaft attachment mechanism.

FIG. 10 is a perspective view of an embodiment of a universal joint 306 attached to HSAM 200. HSAM 200 enables universal joint 306 to be powered by hobby servo 100. HSAM 200 also enables greater performance than if universal joint 306 was attached directly to hobby servo 100.

FIGS. 9 and 10 are only examples of the many items that HSAM 200 allows to be indirectly connected to hobby servo 100. Other items include gears, sprockets, and robot arms. These items and others, achieve improved performance such as increased strength, durability, and reduced slippage.

FIGS. 11-14 are side views of additional illustrative embodiments of hobby servo attachment mechanisms. The embodiments shown in FIGS. 11-14 optionally include elongated shafts with textured outer surfaces (e.g. threaded surfaces). The embodiments shown in FIGS. 11-14 optionally include one or more of the features included within hobby servo attachment mechanism 200 shown in FIGS. 2-10. Similarly, hobby servo attachment mechanism 200 may optionally include one or more of the features shown in FIGS. 11-14. Embodiments are not limited to any particular combination of features and may include any feature or combination of features described in this disclosure.

Figure 11:
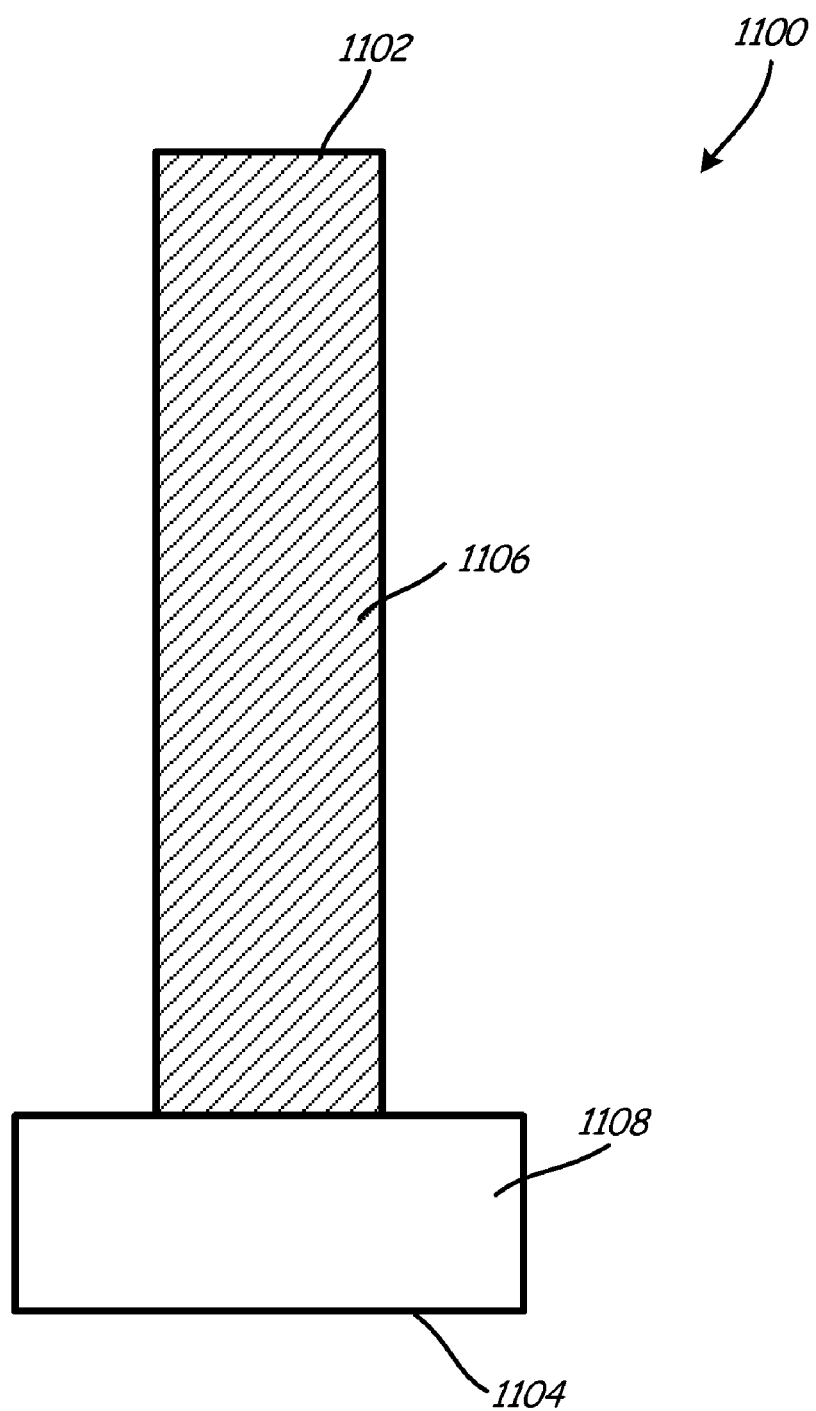
FIG. 11 is a side view of a hobby servo attachment mechanism having an outer shaft with screw threading.

FIG. 11 is a side view of hobby servo attachment mechanism ("HSAM") 1100. HSAM 1100 illustratively includes many of the same or similar features as HSAM 200 shown in FIGS. 2-10. For instance, HSAM 1100 optionally includes a top surface 1102, a bottom surface 1104, and an output shaft attachment housing 1108. In addition to those features, HSAM 1100 also optionally includes a threaded outer surface 1106. Threaded surface 1106 illustratively includes any type of threaded surface such as screw threading or worm screw threading. In one embodiment, threaded surface 1106 engages with a threaded surface of another object and rotates or otherwise transfers motion to the other object. For instance, in one embodiment, threaded surface 1106 includes screw threading that is engaged with the screw threading of another object. As threaded surface 1106 is rotated, the engaged screw threading of the other object is rotated. The other screw threading and/or object may for instance be moved along an axis of rotation that is parallel to the axis of rotation of HSAM 1100. In another embodiment, threaded surface 1106 includes worm screw threading that is engaged with a worm gear. Threaded surface 1106 and the worm gear thus form a worm drive, and threaded surface 1106 rotates the worm gear about an axis of rotation that is different than the axis of rotation of HSAM 1100. For instance, threaded surface 1106 illustratively rotates a worm gear about an axis of rotation that is ninety degrees different than the axis of rotation of HSAM 1100.

Figure 12:
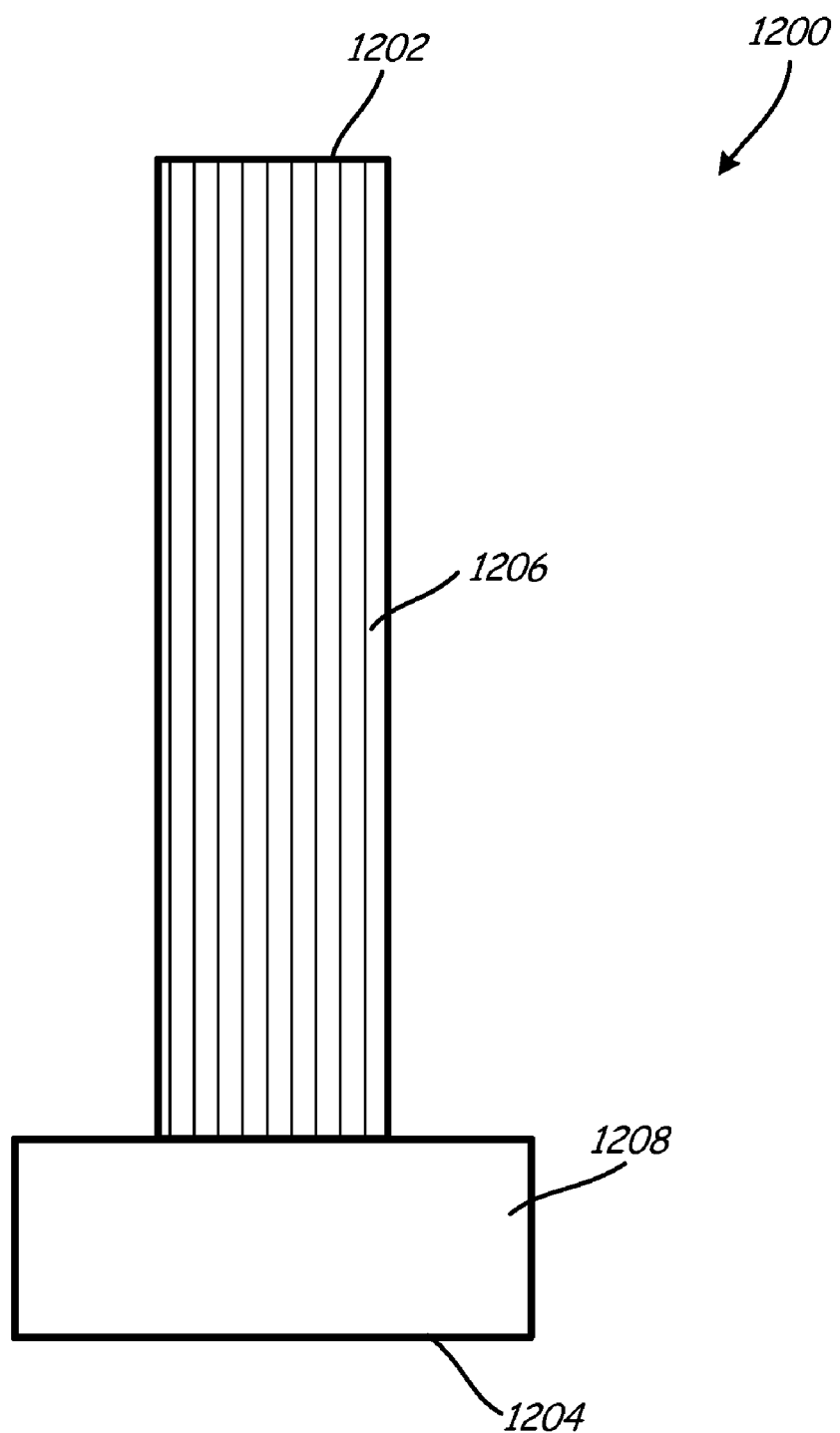
FIG. 12 is a side view of a hobby servo attachment mechanism having an outer shaft with gear teeth.

FIG. 12 is a side view of a hobby servo attachment mechanism (HSAM) 1200. HSAM 1200 also illustratively includes a top surface 1202, a bottom surface 1204, and an output shaft attachment housing 1208. Additionally, HSAM 1200 optionally includes a threaded surface 1206. Threaded surface 1206 illustratively includes gear teeth. For example, in the embodiment shown in FIG. 12, threaded surface 1206 includes vertically oriented gear teeth. In an embodiment, threaded surface 1206 engages with a threaded surface of another object and rotates or otherwise transfers motion to the object. For instance, in one embodiment, threaded surface 1206 includes gear teeth that are engaged with the gear teeth of another object. As threaded surface 1206 is rotated, the engaged gear teeth of the other object are rotated.

Figure 13:
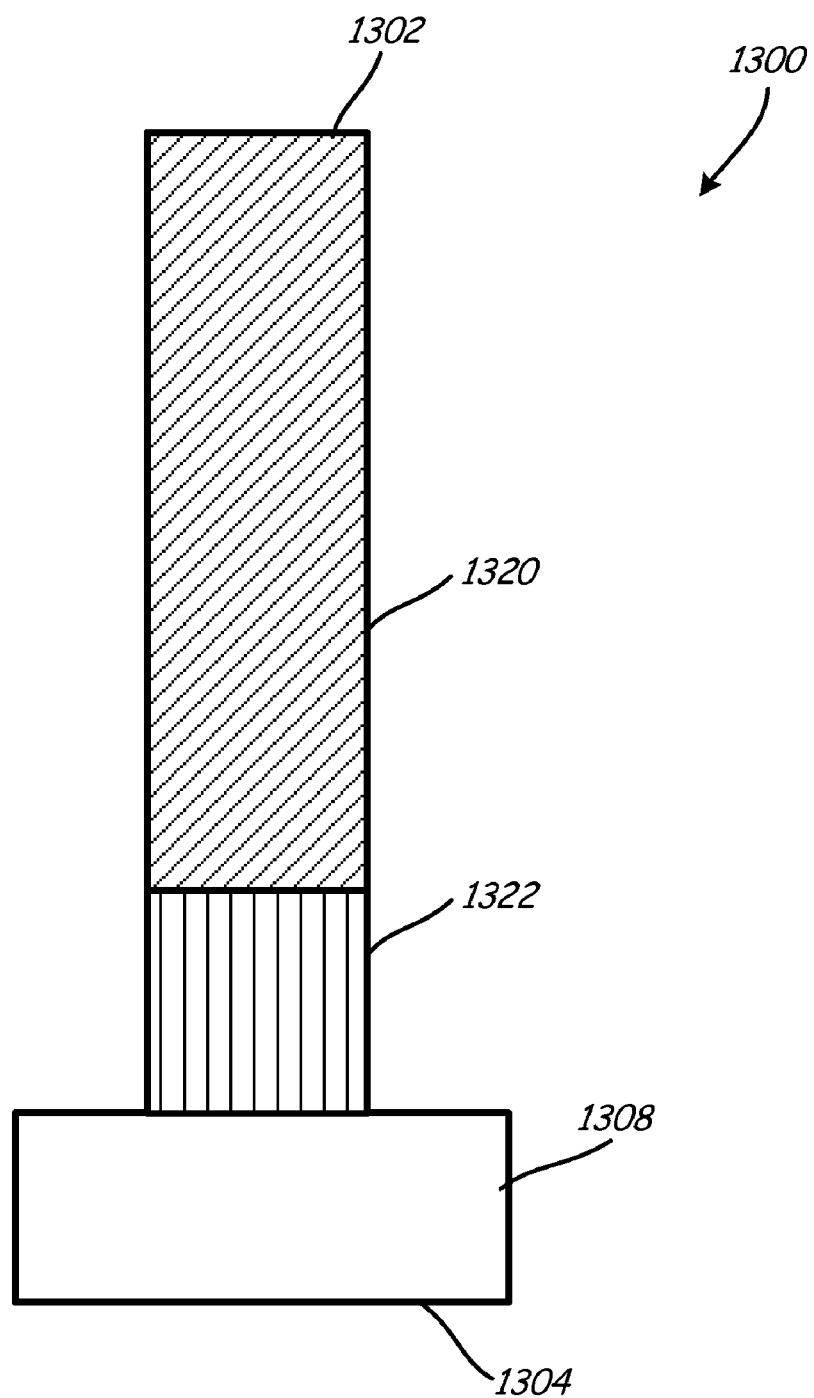
FIG. 13 is a side view of a hobby servo attachment mechanism having an outer shaft with a lower portion having gear teeth and an upper portion having screw threading.

FIG. 13 is a side view of a hobby servo attachment mechanism (HSAM) 1300. HSAM 1300 also illustratively includes a top surface 1302, a bottom surface 1304, and an output shaft attachment housing 1308. Additionally, HSAM 1300 optionally includes two or more different surfaces along the rotatable shaft. In the embodiment shown in FIG. 13, HSAM 1300 includes a first threaded surface 1320 and a second threaded surface 1322. First threaded surface 1320 may for instance include screw, worm screw, gear, or any other type of threading. Second surface 13220 may also illustratively include screw, gear, or any other type of threading. In one embodiment, first and second threaded surfaces 1320 and 1322 include different types of threading (e.g. one includes screw threading and the other gear threading), or alternatively, both surfaces 1320 and 1322 may include the same type of threading. In another embodiment, one or more of surfaces 1320 or 1322 may instead include a non-textured surface (e.g. a smooth outer surface such as that shown in FIGS. 2-8). Additionally, embodiments of HSAM 1300 are not limited to only including two surfaces along the rotatable shaft. Embodiments of HSAM 1300 optionally include any number of surfaces along the rotatable shaft. For instance, HSAM 1300 may include three different surfaces instead of the two shown in FIG. 13 with one surface having screw threading, one gear threading, and the other surface being smooth.

Figure 14:
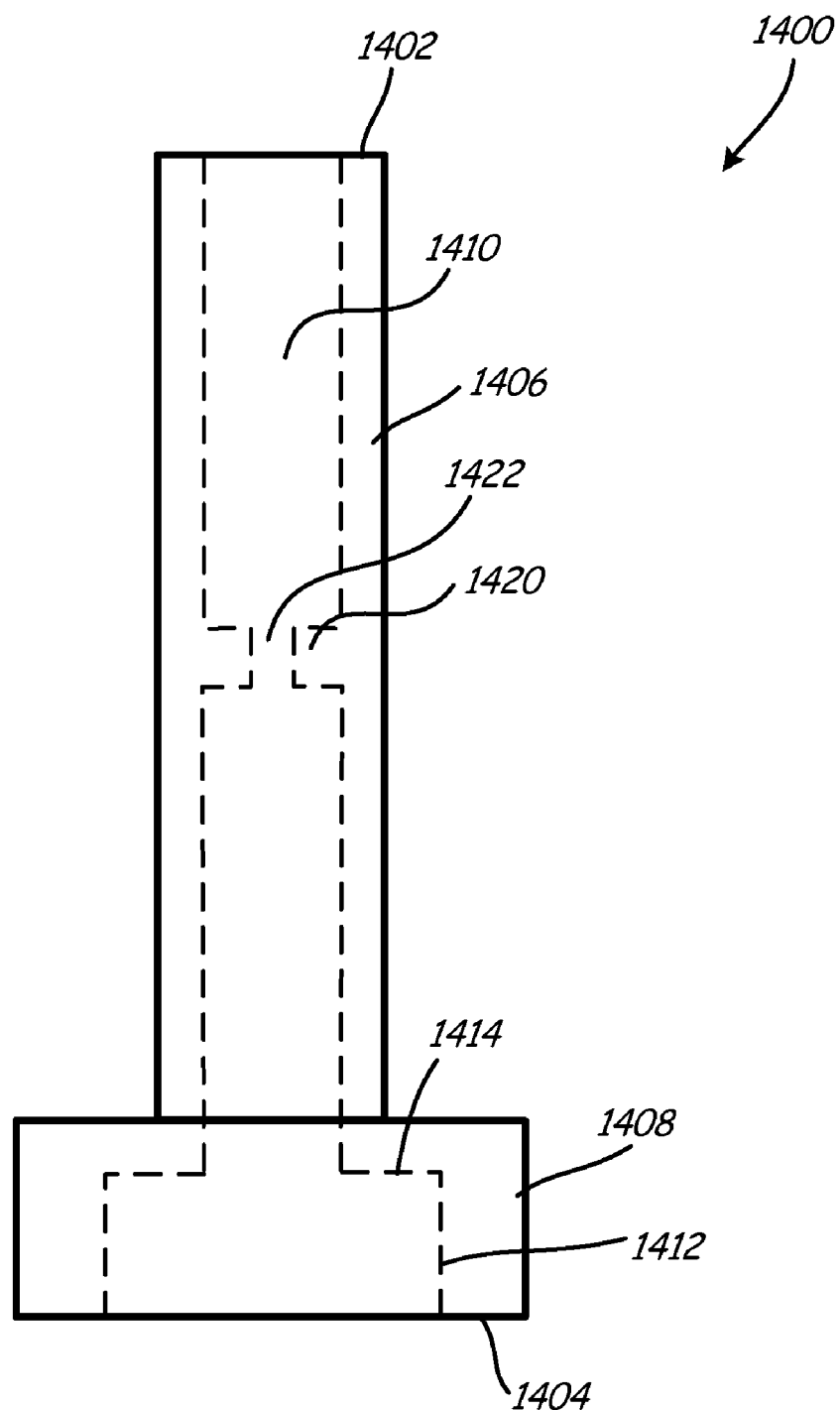
FIG. 14 is a side view of a hobby servo shaft attachment mechanism having an inner aperture and an inner ledge.

FIG. 14 is a side view of an embodiment of a hobby servo attachment mechanism (HSAM) 1400. The view shown in FIG. 14 highlights internal features with dotted lines. HSAM 1400 includes top surface 1402, attachment mechanism orifice 1410, outer surface 1406, output shaft attachment housing 1408, top receiving surface 1414, spline receiving surface 1412, and bottom surface 1404. When HSAM 1400 is engaged to a hobby servo motor, top receiving surface 1414 is illustratively flushly engaged to a top surface (e.g. surface 13 in FIG. 1) of an output shaft of a hobby servo motor, and spline receiving surface 1412 is illustratively engaged with the splined surface (e.g. surface 12 in FIG. 1) of an output shaft of a hobby servo motor. Additionally, bottom surface 1404 is illustratively flushly engaged to a circular planar surface (e.g. surface 15 in FIG. 1) of a hobby servo motor.

FIG. 14 also shows that HSAM 1400 optionally includes an inner ledge 1420 and an inner aperture 1422 within attachment mechanism orifice 1410. In one embodiment, an attachment mechanism (e.g. a screw or a bolt) fits through inner aperture 1422 and extends to the threaded orifice of a hobby servo motor (e.g. orifice 14 in FIG. 1) to attach or otherwise secure HSAM 1400 to a hobby servo motor. A portion of the attachment mechanism (e.g. a head of a screw or a bolt) is illustratively wider than a circumference of inner aperture 1422 such that the portion of the attachment mechanism rests on or is supported by inner ledge 1420. Other embodiments of hobby servo attachment mechanisms (e.g. HSAM 200 in FIGS. 2-10, HSAM 1100 in FIG. 11, HSAM 1200 in FIG. 12, and HSAM 1300 in FIG. 13) may optionally include an attachment mechanism orifice 1410, an inner ledge 1420, and an inner aperture 1422. Embodiments of HSAM's are not however limited to any particular method or devices for attachment to a hobby servo motor and optionally include any methods or devices for attachment.

Although the hobby servo shaft attachment mechanism has been described with reference to particular embodiments, workers skilled in the art will recognize that changes may be made in form and detail without departing from the spirit and scope of the invention.

What is claimed is:

1. An apparatus for providing enhanced hobby servo motor operational capacity, the apparatus comprising:
    a hobby servo motor having a rotatable output shaft, wherein the rotatable output shaft is splined in that it includes a plurality of circumferentially distributed splines;
    a shaft attachment mechanism having a spline receiving portion, the spline receiving portion including a plurality of circumferentially distributed protrusions sized and dispersed so as to support a functional engagement of the shaft attachment mechanism to the rotatable output shaft, the functional engagement being such that rotation of the rotatable output shaft causes a corresponding rotation of the shaft attachment mechanism;
    wherein the shaft attachment mechanism further comprises an elongated shaft that is positioned inline with the rotatable output shaft when the shaft attachment mechanism is functionally engaged to the rotatable output shaft;
    wherein the rotatable shaft includes a top surface that is positioned within a plane that is substantially perpendicular relative to the plurality of circumferentially distributed splines;
    wherein the shaft attachment mechanism includes a top receiving surface that, when the shaft attachment mechanism is functionally engaged to the rotatable output shaft, is positioned proximate to the top surface of the rotatable output shaft within a plane that is substantially perpendicular relative to the plurality of circumferentially distributed splines;
    wherein the top receiving surface flushly engages the top surface of the rotatable output shaft when the shaft attachment mechanism is functionally engaged to the rotatable output shaft; and
    wherein the elongated shaft of the shaft attachment mechanism has an outer surface and at least a portion of the outer surface is textured.

2. The apparatus of claim 1, wherein the textured portion of the outer surface includes threads.

3. The apparatus of claim 2, wherein the threads are screw threads.

4. The apparatus of claim 3, wherein the screw threads are worm screw threads.

5. The apparatus of claim 2, wherein the threads includes gear teeth.

6. The apparatus of claim 1, wherein the outer surface of the attachment mechanism includes multiple portions.

7. The apparatus of claim 6, wherein one of the multiple portions is textured and another one of the multiple portions is non-textured.

8. The apparatus of claim 6, wherein at least two of the multiple portions are textured.

9. The apparatus of claim 8, wherein one of the at least two portions includes screw threads and a second one of the at least two portions includes gear teeth.

10. An apparatus for enhancing an operational capacity of a hobby servo motor having a splined rotatable output shaft, the apparatus comprising:
 a spline receiving portion that includes a plurality of circumferentially distributed protrusions sized and dispersed so as to support a functional engagement of the apparatus to the splined rotatable output shaft of the hobby servo motor, the functional engagement being such that rotation of the splined rotatable output shaft causes a corresponding rotation of the apparatus, the spline receiving portion also including a top receiving surface that, when the spline receiving portion is functionally engaged to the splined rotatable output shaft, is positioned proximate to and flushly engages a top surface of the splined rotatable output shaft; and
 an elongated shaft that is positioned inline with the splined rotatable output shaft when the apparatus is functionally engaged to the splined rotatable output shaft, the elongated shaft having an outer surface and at least a portion of the outer surface is textured.

11. The apparatus of claim 10, wherein another portion of the elongated shaft outer surface is non-textured.

12. The apparatus of claim 10, wherein the entire outer surface of the elongated shaft is textured.

13. The apparatus of claim 12, wherein the textured outer surface of the elongated shaft includes at least two different types of textures.

14. The apparatus of claim 13, wherein one of the at least two different types of textures includes screw threading.

15. The apparatus of claim 13, wherein one of the at least two different types of textures includes gear teeth.

16. An apparatus for enhancing an operational capacity of a hobby servo motor having a rotatable output shaft, the apparatus comprising:
 a shaft attachment mechanism configured to functionally engage the rotatable output shaft of the hobby servo motor such that rotation of the rotatable output shaft causes a corresponding rotation of the shaft attachment mechanism, the shaft attachment mechanism including an elongated shaft that, when the shaft attachment mechanism is functionally engaged to the rotatable output shaft, is positioned along a common axis relative to the rotatable output shaft;
 wherein the shaft attachment mechanism includes a bottom surface configured to flushly engage a portion of a housing associated with the hobby servo motor when the shaft attachment mechanism is functionally engaged to the rotatable output shaft;
 wherein the shaft attachment mechanism includes a top receiving surface that, when the shaft attachment mechanism is functionally engaged to the rotatable output shaft, is positioned proximate to and flushly engages a top surface of the rotatable output shaft; and
 wherein the elongated shaft of the shaft attachment mechanism includes an outer surface and at least a portion of the outer surface is textured.

17. The apparatus of claim 16, wherein the textured outer surface of the elongated shaft includes only one type of texturing.

18. The apparatus of claim 16, wherein the textured outer surface of the elongated shaft include multiple types of texturing.

19. The apparatus of claim 18, wherein one of the multiple types of texturing includes screw threading.

20. The apparatus of claim 18, wherein one of the multiple types of texturing includes gear teeth.

* * * * *